United States Patent [19]

Levy et al.

[11] Patent Number: 4,953,186
[45] Date of Patent: Aug. 28, 1990

[54] PHASE JITTER TRACKER

[75] Inventors: Steve Levy, Nevada City; Dave Hedberg, Danville, both of Calif.; Oscar Agazzi, Scotch Plains, N.J.

[73] Assignee: Silicon Systems, Inc., Tustin, Calif.

[21] Appl. No.: 157,986

[22] Filed: Feb. 19, 1988

[51] Int. Cl.$^5$ .............................................. H04B 1/10
[52] U.S. Cl. ....................................... 375/118; 375/14; 375/120
[58] Field of Search .................. 375/57, 58, 98, 99, 375/101, 118, 119, 120, 14; 455/283, 278, 295, 296; 328/162, 163, 173, 175; 307/511, 520

[56] References Cited

U.S. PATENT DOCUMENTS

| | | | |
|---|---|---|---|
| 3,878,468 | 4/1975 | Falconer et al. | 375/15 |
| 4,032,847 | 6/1977 | Unkauf | 375/102 |
| 4,349,916 | 9/1982 | Roeder | 375/51 |
| 4,458,355 | 7/1984 | Motley et al. | 375/98 |
| 4,475,214 | 10/1984 | Gutleber | 375/96 |
| 4,569,064 | 2/1986 | Collin et al. | 375/120 |
| 4,590,602 | 5/1986 | Wolauer | 375/120 |
| 4,631,738 | 12/1986 | Betts et al. | 375/39 |
| 4,633,485 | 12/1986 | Betts et al. | 375/103 |
| 4,639,682 | 1/1987 | Takeuchi | 375/81 |
| 4,683,578 | 7/1987 | Betts et al. | 375/39 |
| 4,689,804 | 8/1984 | Srinivasagopalan et al. | 375/99 |
| 4,689,805 | 8/1987 | Pyhalammi et al. | 375/98 |

Primary Examiner—Douglas W. Olms
Assistant Examiner—Stephen Chin
Attorney, Agent, or Firm—Hecker & Harriman

[57] ABSTRACT

The jitter tracker of the present invention uses a decision-directed error signal as an input to a feedback loop. The error signal is filtered and coupled to a phase locked loop centered at the center of the jitter tracking frequency range, which in the preferred embodiment is 55 Hz. The frequency width and center track and lock frequencies are set by a loop filter. A second order loop is used to acquire the frequency and phase jitter within an acceptable range. Once within this range, a first order loop is used to lock the amplitude to the input signal. The amplitude and phase values are subtracted from the incoming signal so that a new error may be calculated. In the preferred embodiment, the jitter tracker of the present invention is implemented in a digital signal processor. The jitter tracker of the preferred embodiment of the present invention comprises two filter loops. The first loop is used to generate the magnitude of the jitter error. The second loop generates the phase of the jitter error. The input to the jitter tracker is the quadrature portion of a normalized error term. This quadrature portion is multiplied by the cosine of the output of the error loops to generate the magnitude of the error signal. This term is multiplied by a scaling factor and is then integrated to generate a magnitude error term. The quadrature portion of the normalized error signal is multiplied in the second loop by the sine of the loop output. This phase error signal is coupled to a first order filter within a range in the preferred embodiment of plus or minus 10 Hz from a 55 Hz nominal frequency. The output of this first filter is multiplied by nominal 55 Hz vector and integrated to produce a phase error output. The real portion of this phase error signal is generated and combined with the magnitude error to produce a jitter correction factor for use in the receive channel circuitry.

26 Claims, 2 Drawing Sheets

PHASE JITTER TRACKER

BACKGROUND OF THE INVENTION

I. FIELD OF THE INVENTION

This invention relates to the field of signal processing and in particular to the elimination of jitter from phase encoded signals in a communications receive channel.

II. BACKGROUND ART

Communication of data information over the voice network between a sending and receiving station is typically accomplished with a modem (modulator/demodulator). A modem transforms digital information by modulating it according to one of several well-known modulating schemes. This modulated data is transmitted to the receiving modem, where it is demodulated to produce the original information. In order to properly demodulate and decode transmitted information, the clock phase and carrier phase of the transmission must be known to the demodulator. Typically, timing information is taken from the transmitted signal itself by means of various techniques.

The frequency of the line voltage varies from country to country but is generally in the range of 50 to 60 Hz. Due to the use of this power source in telephone equipment, jitter can be introduced to communication transmissions. Such jitter can cause distortion in an information signal and can hinder decision making of decoding circuitry. Jitter may interfere with the definition of baud windows as it introduces phase shifts, etc., into the information signal. In addition, carrier phase jitter may introduce excess noise in the signal path, particularly with QAM and DPSK transmission, effectively preventing reception of such signals over certain telephone lines.

In order to reduce the effects of such jitter, it must be detected and eliminated. Because the line voltage frequency varies from country to country, any such jitter tracking circuitry must operate over a band of frequencies.

Therefore, it is an object of the present invention to provide a jitter tracker which detects and eliminates jitter components at harmonics of the power line voltage frequency associated with communication systems.

It is a further object of the present invention to provide a jitter tracker which operates over a band of frequencies, particularly in the range of 50 to 60 Hz.

It is yet another object of the present invention to provide a jitter tracker with phase correction capabilites.

SUMMARY OF THE PRESENT INVENTION

The jitter tracker of the present invention uses a decision-directed error signal as an input to a feedback loop. The error signal is filtered and coupled to a phase locked loop centered at the center of the jitter tracking frequency range, which in the preferred embodiment is 55 Hz. The frequency width and center track and lock frequencies are set by a loop filter. Part of a second order loop is used to acquire the jitter frequency within an acceptable range. Once within this range, this loop acquires the phase of the input signal and a first order loop matches the amplitude. The amplitude and phase values are subtracted from the incoming signal so that a new error may be calculated. In the preferred embodiment, the jitter tracker of the present invention is implemented in a digital signal processor.

It should be noted that calculation of the phase of a complex valued signal is costly in terms of processor resources. The preferred embodiment approximates the phase by use of the imaginary portion of the complex word. Since in this implementation the phase deviation is kept small, the error introduced by the approximation is insignificant.

The jitter tracker of the preferred embodiment of the present invention comprises two filter loops. The first order loop is used to generate the magnitude of the jitter error. The second order loop generates the phase of the jitter error. The input to the jitter tracker is the imaginary portion of the normalized error item. This imaginary portion is multiplied by the cosine of the output of the error loops to generate the magnitude of the error signal. This error signal is multiplied by a scaling factor and is then integrated to generate the magnitude error term.

The imaginary portion of the normalized error signal is multiplied in a second loop by the sine of the loop output. This phase error signal is coupled to a first order filter with a range in the preferred embodiment of plus or minus 10 Hz from a 55 Hz nominal frequency. The output of this filter is added to a nominal 55 Hz vector and integrated to produce a phase error input. The real portion of this phase error signal is generated and multiplied by the magnitude error to produce a jitter correction factor for use in the receive channel circuitry.

DETAILED DESCRIPTION OF THE PRESENT INVENTION

A jitter tracker for removing jitter from an incoming data signal is described. In the following description, numerous specific details, such as center frequency, frequency range, etc, are described in order to provide a more thorough description of the present invention. It will be obvious, however, that to one skilled in the art, that the present invention may be practiced without these specific details. In other instances, well-known features have not been described in detail in order not to unnecessarily obscure the present invention.

In the present invention, a normalized error term of an input signal is generated. The imaginary portion of this normalized error is coupled to the jitter tracker circuitry. In the preferred embodiment, the jitter tracker circuitry consists of first and second order loop filters forming the phase jitter locked loop. The first loop of the jitter tracker is used to generate the magnitude of the jitter error. The imaginary portion of the normalized error is coupled to a multiplier where it is multiplied by the cosine of the loop error term. The output of this multiplier is the magnitude of the jitter error. This magnitude error is integrated and outputted to a multiplier.

It should be noted that the preferred embodiment of the present invention approximates the phase by use of the imaginary portion of a complex word. Since in this implementation the phase deviation is kept small, the error introduced by the approximation is insignificant. Similarly, the magnitude of the error is approximated by the real portion of a complex word. Any errors introduced by this approximation are also insignificant. Of course, the actual phase and magnitude values may be used in implementing the present invention without departing from its scope.

The second loop of the jitter tracker multiplies the imaginary portion of the normalized error by the sine of the loop output error to generate the jitter phase error. This phase error is coupled to a first order filter to acquire the jitter within an acceptable range. In the preferred embodiment of the present invention, the filter has an error range of plus or minus 10 Hz. The output of this first order filter is added to a nominal 55 Hz frequency vector, integrated and coupled to the multiplier along with the magnitude error. The phase and magnitude error are multiplied with a scaling factor at the multiplier and outputted to the receive channel loop.

Figures 1A, 1B:
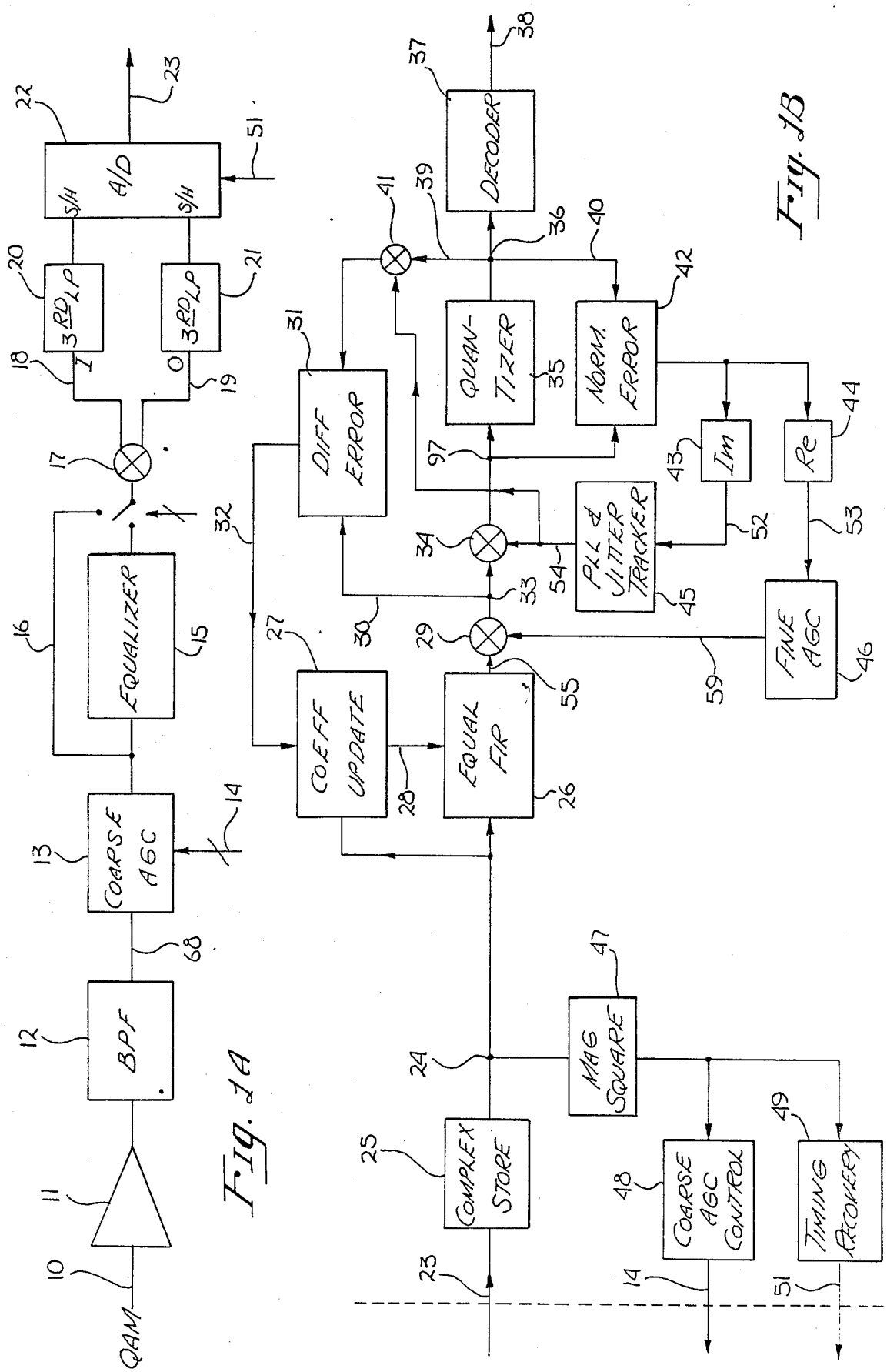
FIGS. 1A and 1B are a block diagram illustrating a receive channel utilizing the jitter tracker of the present invention.

In the preferred embodiment, the present invention is used in the receive channel of a modem. Referring to FIG. 1, a block diagram of a modem receive channel is illustrated. In the example herein, the input signal is a quadrature amplitude modulation (QAM) signal. However, the present invention has equal application to DPSK signals. the QAM signal 10 is inputted to an anti-aliasing filter 11. The output of the anti-aliasing filter 11 is passed through a band pass filter 12 whose output is coupled to the coarse AGC stage 13 of the present invention. The coarse AGC stage tracks large transients with a low settling time. A digital input controls the gain of coarse AGC 13 and is inputted into coarse AGC 13 on bus 14. In the preferred embodiment, the digital word is 7 bits but may be of any desired length without departing from the scope of the present invention.

The output of coarse AGC stage 13 is inputted to equalizer 15. A bypass loop 16 couples the input of equalizer 15 alternatively to the input of fixed demodulator 17. The output of equalizer 15 is coupled to fixed demodulator 17. Fixed demodulator 17 outputs both inphase and quadrature demodulated portions of the input signal. The inphase signal I18 is inputted to a third order low pass filter 20. The quadrature portion Q19 of the demodulated signal is inputted to a third order low pass filter 21. The outputs of filters 20 and 21 are inputted to sample and holds of the analog to digital converter (A/D) 22.

The inphase and quadrature signals are sampled simultaneously and one is held in a sample and hold while the other is immediately sent to the remainder of the signal path. The quadrature signal is held and then converted and sent on to the digital signal path circuitry. In the preferred embodiment of the present invention, the sample and hold is on the quadrature channel. The output of the A/D 22 is two 8 bit words in offset binary format.

The output 23 of A/D 22 is coupled at node 24 to delay line 25. The output of four word complex store 25 is inputted to equalizer/finite impulse response (FIR) filter 26. The output of complex store 25 is also inputted to coefficient update 27. The output 28 of coefficient update 27 is inputted to equalizer/FIR 26. The output 55 of FIR 26 is inputted to fine AGC gain coefficient 29. The output of fine AGC gain coefficiency at node 33 is coupled on line 30 to differential error 31 and phase coefficient 34. The output of phase coefficient 34 is coupled to quantizer 35 and normalized error 42.

The output of quantizer 35 at node 36 is coupled to decoder 37. The output 38 of decoder 37 is the output of the receive channel. The output of quantizer 35 at node 36 is also coupled on line 39 to decision modifier 41 and on line 40 to normalized error 42. The output of decision modifier 41 is coupled to differential error 31 whose output 32 is coupled to coefficient update 27. The output 28 of coefficient update 27 is coupled to equalizer/FIR 26.

The output of normalized error 42 is coupled to Im 43 and Re 44. The output 53 of Re 44 is coupled to the fine AGC stage 46. The output 59 of fine AGC stage 46 is coupled to fine AGC gain coefficient 29. The output 52 of Im 43 is coupled to PLL 45. The output 54 of PLL 45 is coupled to phase coefficient 34 and decision modifier 41.

The output of mag squared 47 is coupled to coarse AGC control 48 and timing recovery 49. The output 14 of coarse AGC control 48 is coupled to the control line 14 of the coarse AGC stage 13. The output 51 of timing recovery 49 is coupled to A/D 22. The output 51 determines when the sample and hold of the LPF outputs is performed.

The two stage AGC system used in the receive channel circuitry of FIG. 1 achieves improved tracking performance for gain transients and AM noise peaks while maintaining stable tracking of the QAM signal level in the presence of normal data modulation. The coarse AGC stage uses an error signal derived from the noncoherent power flutations of the incoming signal. The coarse AGC acquires a new signal by using a fast nonlinear step size feedback loop technique in conjunction with a slow linearized feedback loop. After acquiring the signal, the purpose of the coarse AGC stage is to maintain a constant average signal level at the input to the A/D converter and through the modem front end signal processing blocks. The coarse AGC tracks the acquired signal by using a nonlinear error power detector and a slow first order tracking loop.

The fine AGC stage uses a decision-directed coherent amplitude error signal and a fast linear feedback loop that corrects for small faster signal level fluctuations. That is, for smaller transients of short time duration. The fine AGC loop has a high pass characteristic used to decouple its response from that of the other decision directed algorithms. The combined response of the coarse AGC and fine AGC determine the overall behavior of the receiver in the presence of signal level changes. This response can be optimized for best performance with the slowly varying and transient disturbances as typically encountered in telephone circuitry.

Still referring to FIG. 1, the QAM (or other) signal 10 is inputted to the receive channel circuitry at anti-aliasing filter 11. The output of anti-aliasing filter 11 is coupled to a band pass filter 12 which separates the input signal to two bands. In the preferred embodiment, there are two transmission bands, high and low, and the band pass filter 12 passes either the high or the low band to the processor. In the preferred embodiment, the input signal is received at 600 baud.

The output 68 of the band pass filter 12 is coupled to the coarse AGC 13. The coarse AGC has a dynamic range of 50 dB and is controlled by a digital word input on line 14. The gain increments of the coarse AGC 13, in the preferred embodiment, are approximately 0.375 to 0.4 dB per step. Because there are 128 steps (controlled by 7 bits) the dynamic range of the coarse AGC is 48 to 50 dB. In the preferred embodiment, the coarse AGC stage is implemented by OPAMPs and capacitor ratios which are selectively activated by means of the digital control signal. Such type of switched capacitor automatic gain control circuits are described in U.S. patent application Ser. No. 06/774,544 entitled MOS Switch Capacitor Automatic Gain Control Circuit and assigned to the assignee of the present invention.

The output of the coarse AGC 13 is coupled to equalizer 15. The bypass loop 16 is coupled between the input and output of equalizer 15. The bypass loop 16 is controlled by a control bit outputted by the coarse AGC control 48. Equalizer 15 introduces a delay into the signal path of approximately 3 to 4 milliseconds (on the order of 2 to 3 baud time). In the fast tracking mode, the bypass loop 16 is coupled from the output of coarse AGC 13 so that equalizer 15 is bypassed. In the fast tracking mode, the input signal is locked onto by the coarse AGC. After signal acquistion, the bypass loop 16 is deactivated so that the equalizer 15 is active in the signal path. In this configuration, the circuit performs slow tracking of the input signal. If a large transient is detected, the bypass loop 16 is activated and the path returns to the fast tracking mode.

The output of equalizer 15 is coupled to fixed demodulator 17 which is used to generate inphase and quadrature versions of the input QAM signal. Both the inphase and quadrature outputs 18 and 19 of demodulator 17 are passed through low pass filters 20 and 21 and inputted to sample and holds of A/D 22. The input signal to A/D 22 is converted to an eight bit offset binary word.

The control signal 51 enables the sample and holds to capture a sample and begin the A/D conversion on one of the samples. After the I sample has been converted the Q sample is also converted and the A/D 22 outputs two digital words on line 23 to complex store 25. The complex store 25 is a four word complex store and stores four sample in real time, occurring at a 2400 Hz rate.

The output at node 24 of complex store 25 is inputted to mag square 47 which is simply the square of the sample from complex store 25. The coarse AGC integrates the samples to give the power level of the signal. This enables the coarse AGS control 48 to indicate a detected carrier on the input signal line. By using power detection, the present invention is independent of the modulation technique utilized in the input signal. Therefore, a single algorithm can be employed to provide automatic gain control and carrier level detection. For example, the present invention has equal applicability to QAM, DPSK, and FSK types of modulation schemes.

The remainder of the signal path is a series of interacting feedback loops includng a differential error loop, a normalized error loop, and PLL and fine AGC loop associated with the normalized loop. The differential error loop feeds back terms to FIR 26 to modify the coefficients of the equalizer so that the output of FIR 26 can minimize intersymbol interference. The normalized error loop is separated into an imaginary and real part, with the imaginary portion fed to a PLL and the real portion is inputted to the fine AGC control 46.

Node 24 is coupled to FIR filter 26. In the preferred embodiment of the present invention, the FIR filter 26 is an 11 tap filter including a DC tap to remove DC offset from the incoming signal. The taps of the filter 26 store the second and fourth samples outputted by complex store 25. All four samples are used by the course AGC control 48 and timing recovery 49. However, the FIR filter is a T/2 equalizer, therefor, only the second and fourth samples are utilized in the FIR filter 26.

The FIR filter 26 is an equalizer with a prescribed response time. As a result, amplitude variations may occur more frequently than the equalizer/FIR filter 26 can respond. A fine AGC feedback loop is utilized to correct such amplitude errors. The fine AGC is limited to 3 dB of correction in the preferred embodiment of the present invention. Larger perturbations in amplitude are corrected by the coarse AGC.

Each of the taps in the equalizer/FIR 26 is multiplied by its corresponding coefficient (generated by the various feedback loops). The FIR 26 outputs one complex WORD 55 per baud. The complex WORD 55 is inputted to multiplier 29 and is multiplied by a gain coefficient 59 generated by fine AGC 46, (nominally a gain of one). The output of multiplier 29 at node 33 is, (when the loop is stabilized) a signal which has correct amplitude, although it may have phase and frequency offset and jitter.

The signal at node 33 is coupled to multiply 34 and is multiplied by the correction signal 54 to correct for frequency and phase offset. Signal 54 is the output of PLL and jitter tracker 45. The output of multiplier 54 at node 97 is ideally free of phase and frequency offset and jitter. This signal is now quantized at quantizer 35. The quantizer 35 outputs values which are quantized to specific points in the 16 point QAM constellation.

Quantizer 35 outputs 16 specific values at node 36. The difference error and normalized error are calculated for these values. The normalized error is a vector type error. The signal at node 97 is coupled to normalized error block 42 along with quantized signal 40 from node 36. The input signal 97 is divided by the quantized signal to give a ratioed difference for use by PLL 45 and fine AGC 46.

The output of normalized error block 42 is a two part signal having imaginary 43 and real 44 parts. The real portion 44, an approximation of the magnitude, is the ratioed distance between the actual constellation point and the ideal constellation point. Any distance errors are a result of gain errors. Therefore, this real portion 44 is coupled to fine AGC 46 for gain correction.

The imaginary portion 43 of the output of normalized error block 42 is the ratio phase difference of the actual constellation points and ideal constellation points. Thus, the imaginary portion 43 may be used for phase correction and is therefore coupled to PLL and jitter tracker 45 for phase, frequency and jitter correction.

The difference error block 31 has two inputs, one being the undemodulated signal 30 from node 33. The other input to difference error block 31 is the output of multiplier 41. Multiplier 41 combines the phase correction signal 54 and the quantized signal output of quantizer 35 at node 36. The output 32 of the difference error block 31 is the error introduced by the equalizer/FIR 26. This error signal 31 is coupled to coefficient update block 27 to update the tap coefficient of the equalizer/FIG 26.

The jitter tracker 45 comprises first and second loops with the second loop centered at the mid-point of the jitter tracker frequency range, which in the preferred embodiment is 55 Hz. The first loop is a first order loop used to generate the magnitude of the jitter error signal. The second loop, a second order loop, generates the frequency and phase of the jitter error to acquire the jitter in the desired range (plus or minus 10 Hz). The frequency error is added to a scaling factor which is a nominal 55 Hz frequency vector. This output is integrated and multiplied by the magnitude error and outputted to the receive channel loop.

Figure 2:
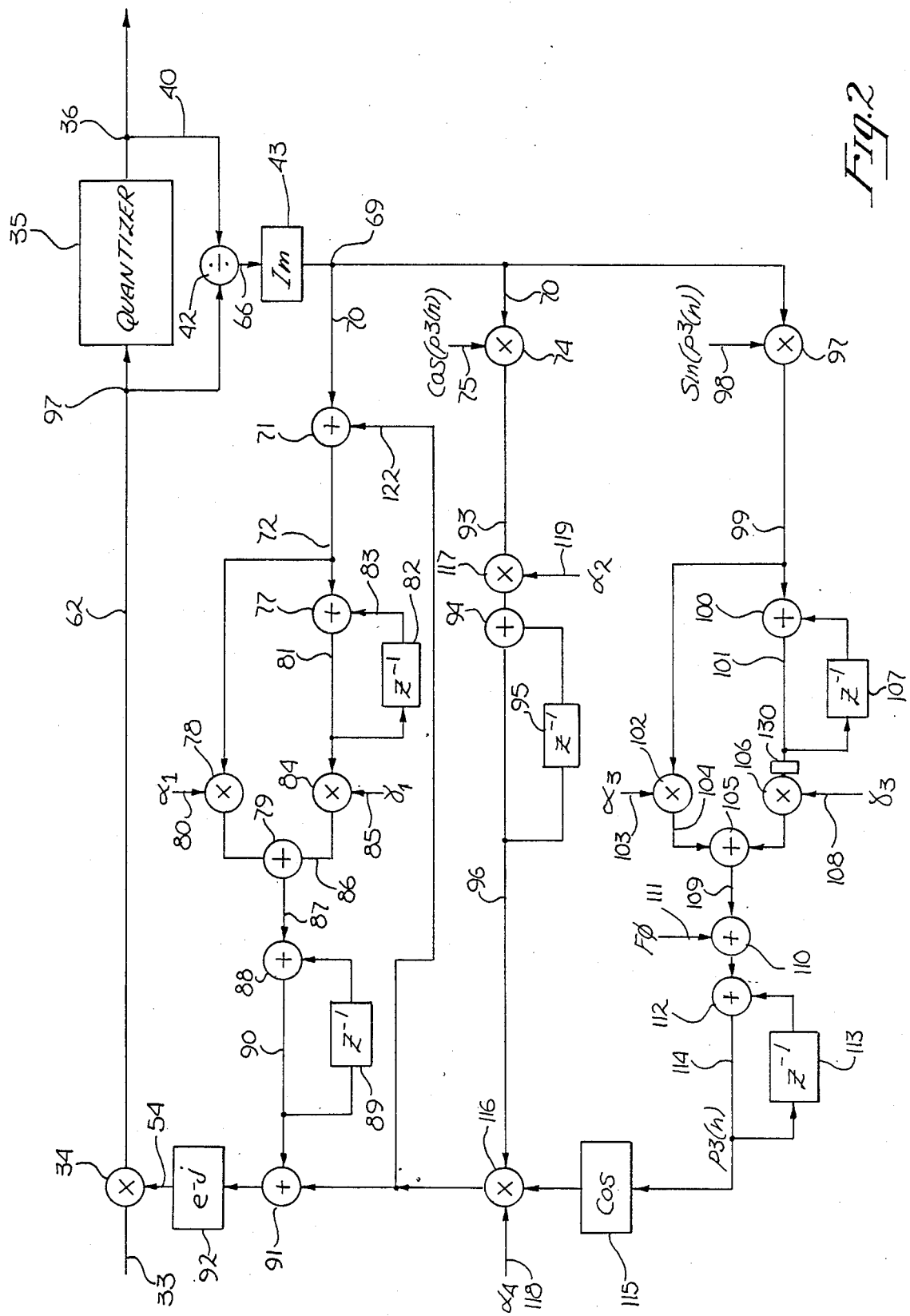
FIG. 2 is a block diagram illustrating the preferred embodiment of the jitter tracker of the present invention.

The preferred embodiment of the present invention is illustrated in FIG. 2. FIG. 2 is a detailed view of the phase lock loop and jitter tracker 45 of FIG. 1B. The phase lock loop begins at node 69 and ends at adder 91. The jitter tracker consists of two loops, the first loop beginning at node 69 and producing signal 96 to multiplier 116 and the second loop also beginning at node 69 and producing the output at cosine 115 which is coupled multiplier 116.

The quadrature signal from node 33 is inputted to multiplier 34 where it is combined with an error signal 54. The output 62 of multiplier 34 at node 97 is inputted to quantizer 35 and to divider 42. The output 40 of quantizer 35 at node 36 is also coupled to divider 64 to generate the normalized error 66 of the input signal. This imaginary portion 43 of the signal 66 is coupled to the PLL and jitter tracking loops at node 69.

As noted previously, the phase lock loop begins at node 69. The signal 70 at node 69 is inputted to adder 71. The output 72 of adder 71 is coupled to adder 77 and multiplier 78. The signal 72 is combined with a scaling factor 80 at multiplier 78.

The output 81 of adder 77 is coupled to multiplier 84 and in a feedback fashion to delay 82. The output 83 of delay 82 is coupled in the feedback loop to adder 77. The output 81 of adder 77 is combined at multiplier 84 with a scaling factor 85. The output 86 of multiplier 84 is combined with the output of multiplier 78 at adder 79.

The output 87 of adder 79 is coupled to adder 88. The output 90 of adder 88 is coupled to adder 91 and to itself in a feedback loop delay 89.

As noted above, the jitter tracker consists of two loops. In the first loop, the signal 70 from node 69 is coupled to multiplier 74 with a scaling term 75. The output 93 of multiplier 74 is coupled to multiplier 117 and combined with a second scaling term 119. The output of multiplier 117 is coupled to adder 94. The output 96 of adder 94 is coupled to multiplier 116 and to itself in a feedback loop delay 95.

The second part of the jitter tracking loop begins with signal 70 at node 69 coupled to multiplier 97 along with a scaling term 98. The output 99 of multiplier 97 is coupled to adder 100 and multiplier 102. Output 99 is combined at multiplier 102 with a scaling factor 103. The output 104 of multiplier 102 is coupled to adder 105.

The output 101 of adder 100 is coupled through limiting block 130 to multiplier 106 and to itself in a feedback loop through delay 107. The output 101 is combined at multiplier 106 with a scaling signal 108. The output of multiplier 106 is coupled to adder 105. The limiting block 130 restricts the lock range of the jitter tracker to a desired frequency range. In the preferred embodiment of the present invention, the lock range is plus or minus 10 Hz from the nominal 55 Hz frequency.

The output 109 of adder 105 is combined with a scaling factor 111 at adder 110. The output of adder 110 is coupled to adder 112. The output 114 of adder 112 is coupled to cosine 115 and to itself in a feedback loop through delay 113.

The output of cosine 115 is coupled to multiplier 116 along with signal 96 from the first jitter loop and a scaling factor 118. The output of multiplier 116 is coupled to adder 91 along with the output of the phase lock loop. The output of adder 91 is coupled to block 92 to produce output 54.

The output 122 of multiplier 116 is also provided to adder 71 to decouple the jitter tracker from the nominal phase lock loop. The present invention also contemplates decoupling the phase lock loop from the jitter tracker as well if desired.

In operation, the imaginary portion 43 of differential error 66 is, for small errors, the phase error of the input signal. The purpose of the jitte tracker loop is to determine the magnitude and the phase of the jitter error component. The error signal 70 is multiplied by the cosine 75 of the jitter loop output at multiplier 74 to generate the magnitude 93 of the jitter error. The jitter error 70 is multiplied by the sine 98 of the jitter loop output at multiplier 97 to generate the phase component 99 of the jitter error.

Referring first to the path through multiplier 74, the signal 93 represents the magnitude of the jitter error. This error signal is then integrated through a zero centered integrator. If there is substantially no jitter, a continued integration of the signal results in a zero output. This signal 96 is coupled to multiplier 116 along with the output of the phase portion of the jitter loop and a scaling factor 118. Therefore, if the magnitude of the jitter error is zero, the output of multiplier 116 (the jitter correction factor) will be zero as well. Prior to being integrated, the magnitude signal 93 is multiplied by gain factor 119 at multiplier 117 to prevent the loop from becoming unstable.

As noted previously, the phase component of the jitter error 99 is generated by multiplying the jitter error 70 with the sine 98 of the loop output of multiplier 97. The multiplication takes the term which is nominally residing at 55 Hz and demodulates it down to DC. Coefficients 103 and 108 define the capture boundaries of the phase loop of the jitter tracker.

Scaling factor 111 is a nominal 55 Hz frequency vector combined with the output 109 of adder 105 and integrated to produce output 114. This output frequency 114 rotates at the frequency at which there is a response, locking on the maximum energy in the capture range. By shifting to that frequency and phase, the proper amplitude component can be subtracted to remove the jitter term of the input signal. Cosine 115 generates the real portion of the phase variable 114 and combines it with the magnitude portion at multiplier 116 so that the proper frequencey and amplitude signal may be generated. The nominal frequency may also be set so as to cancel harmonics from the signal.

The phase lock loop between node 69 and adder 91 is substantially identical to the phase loop portion of the jitter tracker. However, the phase loop is zero centered whereas the jitter phase loop is centered at a nominal 55 Hz.

The present invention could also be utilized to cancel harmonics of the jitter by providing additional jitter tracking channels set to various center frequencies or by providing a plurality of paths to loops having desired center frequencies.

Thus, a novel method of tracking and removing jitter has been described.

We claim:

1. A circuit for detecting and eliminating frequency jitter in an input signal comprising:
   sampling means for sampling said input signal and generating a normalized error signal;

a first loop coupled to said normalized error signal for generating a magnitude component of said normalized error signal, said first loop comprising a first multiplier for multiplying said normalized error by a first factor to generate said magnitude component, said magnitude component coupled to a first integrator for generating a first error output signal;

a second loop coupled to said normalized error signal for generating a phase component of said normalized error signal, said second loop comprising a second multiplier fo multiplying said normalized error by a second factor to generate said phase component, said phase component coupled to a first order filter for acquiring said phase component within a desired range and outputting a second error output signal, said second error output signal coupled to a second integrator for generating a third error output signal;

a third multiplier coupled to said first error output signal, said third error output signal and a scaling factor for outputting a fourth error output signal for combining with said input signal at a combining means for eliminating jitter in said input signal.

2. The circuit of claim 1 wherein said first factor is the cosine of said third error output signal.

3. The circuit of claim 1 wherein said second factor is the sine of said third error output signal.

4. The circuit of claim 1 wherein said normalized error signal has a magnitude and phase component and said phase component is coupled to said first and second multipliers.

5. The circuit of claim 1 wherein said desired range is approximately 45 to 65 Hz.

6. The circuit of claim 1 further including an adder coupled to said second error output signal for adding a nominal frequency vector to said second error output signal, said adder having an output coupled to said second integrator.

7. The circuit of claim 6 wherein said nominal frequency vector has a frequency of approximately 55 Hz.

8. The circuit of claim 2 wherein said magnitude component is approximated by a real portion of a complex error signal and said phase component is approximated by an imaginary portion of said complex error signal.

9. A circuit for detecting and eliminating jitter from an input signal comprising:

sampling means coupled to said input signal for sampling said input signal and generating a normalized error signal having an imaginary component;

a first loop coupled to said imaginary component for generating a magnitude error of said imaginary component, said first loop having a first multiplier coupled to said imaginary component and to a first factor, said first multiplier having a first output, a first integrator coupled to said first output and outputting a second output;

a second loop coupled to said imaginary component for generating a phase error of said imaginary component, said second loop having a second multiplier coupled to said imaginary component and to a second factor, said second multiplier having a third output, a first lowpass filter means coupled to said third output for acquiring said third output in a desired range, said filter means having a forth output, a first adder coupled to said fourth output and to a third factor, said first adder having a fifth output, a second integrator coupled to said fifth output and outputting a sixth output;

a third multiplier coupled to said second and sixth outputs and to a scaling factor, said third multiplier outputting a seventh signal for combining with said input signal at a combining means to eliminate jitter in said input signal.

10. The circuit of claim 9 wherein said first factor comprises the cosine of said sixth output.

11. The circuit of claim 9 wherein said second factor comprises the sine of said sixth output.

12. The circuit of claim 9 wherein said third factor comprises a nominal frequency vector.

13. The circuit of claim 12 wherein said nominal frequency vector has a frequency of approximately 55 Hz.

14. The circuit of claim 9 wherein said desired range is approximately 45 to 65 Hz.

15. A circuit for detecting and eliminating frequency jitter in an input signal comprising:

a first phase locked loop coupled to said input signal for acquiring said frequency jitter and determining the magnitude of said frequency jitter;

a second loop coupled to said input signal for acquiring the phase of said frequency jitter;

a subtraction means coupled to said input signal, said first loop and said second loop for subtracting said phase and magnitude of said frequency jitter from said input signal to generate a first error signal;

combining means coupled to said input signal and said subtraction means for combining said first error signal with said input signal;

said first loop including sampling means coupled to said input signal for sampling said input signal and generating a normalized error signal having an imaginary component.

16. The circuit of claim 15 wherein said magnitude component is coupled to a first integrator for generating a second output signal 17. The circuit of claim 15 wherein said second loop comprises a first multiplier for multiplying said normalized error by a first factor to generate said phase component, said phase component coupled to a first order filter for acquiring said phase component within a desired frequency range and outputting a third error output signal.

18. The circuit of claim 17 wherein said second loop further includes an integrating means coupled to said third error output signal for generating a fourth error output signal.

19. A method for detecting and eliminating frequency jitter in an input signal comprising the steps of:

receiving said input signal and determining a magnitude of said frequency jitter wherein said step of determining said magnitude comprises generating a normalized error signal and providing said normalized error signal to first order loop to generate said magnitude of said frequency jitter;

determining a phase of said frequency jitter;

generating a first error signal by subtracting said phase and amplitude of said frequency jitter from said input signal;

combining said first error signal with said input signal to remove said frequency jitter from said input signal.

20. The method of claim 19 wherein said step of determining said phase of said frequency jitter comprises multiplying said normalized error signal by a first factor to generate said phase.

21. A circuit for detecting and eliminating frequency jitter in an input signal comprising:
a first phase locked loop coupled to said input signal for acquiring said frequency jitter and determining a magnitude component of an imaginary component of said frequency jitter;
a second loop coupled to said input signal for acquiring the phase of said frequency jitter;
a subtraction means coupled to said input signal, said first loop and said second loop for subtracting said phase and amplitude of said frequency jitter from said input signal to generate a first error signal;
a combining means coupled to said input signal and said subtraction means for combining said first error signal with said input signal;
said first loop including sampling means coupled to said input signal for sampling said input signal and generating a normalized error signal having said imaginary component, and further including a first order filter loop coupled to said normalized error signal for generating said magnitude component.

22. The circuit of claim 21 wherein said magnitude component is coupled to a first integrator for generating a second output signal.

23. The circuit of claim 21 wherein said second loop comprises a first multiplier for multiplying said normalized error by a first factor to generate said phase component, said phase component coupled to a first order filter for acquiring said phase component within a desired frequency range and outputting a third error output signal.

24. The circuit of claim 23 wherein said second loop further includes an integrating means coupled to said third error output signal for generating a fourth error output signal.

25. A method for detecting and eliminating frequency jitter in an input signal comprising the steps of:
receiving said input signal and detemining a magnitude of an imaginary component of said frequency jitter wherein said step of determining said magnitude comprises generating a normalized error signal and providing said normalized error signal to a first order loop to generate said magnitude of said imaginary component;
determining a phase of said frequency jitter;
generating a first error signal by subtracting said phase and amplitude of said frequency jitter from said input signal;
combining said first error signal with said input signal to remove said frequency jitter from said input signal.

26. The method of claim 25 wherein said step of determining said phase of said frequency jitter comprises multiplying said normalized error signal by a first factor to generate said phase.

* * * * *